United States Patent [19]

Gadelius

[11] Patent Number: 4,635,772

[45] Date of Patent: Jan. 13, 1987

[54] CLUTCH ARRANGEMENT, PARTICULARLY FOR VARIABLE SPEED GEARS

[76] Inventor: Gustaf Gadelius, Stockholmsvägen 70, S-18142 Lidingö, Sweden

[21] Appl. No.: 683,620

[22] Filed: Dec. 19, 1984

[30] Foreign Application Priority Data

Dec. 22, 1983 [SE] Sweden ............................... 8307120

[51] Int. Cl.⁴ ...................... F16D 41/00; F16D 15/00
[52] U.S. Cl. ................................ 192/45.2; 192/41 R; 192/45.1; 74/162; 248/246
[58] Field of Search ................... 192/45.2, 41 A, 45.1, 192/41 R; 74/144, 156, 160, 162; 248/246, 297.2, 297.5

[56] References Cited

U.S. PATENT DOCUMENTS 768,929  8/1904  Breese ................................ 248/246
4,156,515  5/1979  Mochly ............................... 248/246

FOREIGN PATENT DOCUMENTS 184643  7/1963  Sweden ................................ 74/162
1560724  2/1980  United Kingdom ................ 248/246

Primary Examiner—Rodney H. Bonck
Assistant Examiner—David A. Testardi
Attorney, Agent, or Firm—Young & Thompson

[57] ABSTRACT

A clutch arrangement for coupling together two mechanisms. A first member comprises a lever arm having a partially cylindrical section, the partially cylindrical section having secured to a planar surface a gripping element extending parallel to and spaced from the axis of the partially cylindrical section. The first member further comprises a guide in which the partially cylindrical section may rotate. The second member comprises a recess adapted to receive the guide, and a gripping surface adapted to cooperate with the gripping element of the first member. The first and second members are so dimensioned that when the first and second elements are coupled, the planar surface of the partially cylindrical section and the planar gripping surface of the second member are spaced from and parallel to one another. The gripping element bears against the gripping surface, thereby restricting rotation of the lever arm in at least one direction.

4 Claims, 6 Drawing Figures

CLUTCH ARRANGEMENT, PARTICULARLY FOR VARIABLE SPEED GEARS

The present invention relates to a clutch arrangement for coupling together two members, and in particular members of a variable speed gear or transmission, which are axially movable or rotatable relative to one another and of which members one is provided with a guide means having mutually parallel guide surfaces along which a coupling element is slidably guided with each of two clamping or gripping surfaces abutting a respective guide surface when the other of said members acts in one direction upon a lever-forming and power-transmitting part of the coupling element, while said element is clamped firmly by the guide surfaces when said lever-forming part of the coupling element is acted upon in the opposite direction.

Such coupling elements forming part of a clutch means are arranged to be clamped and released alternately, to transmit power between the rectilinear movable or rotatable members. Coupling elements of this kind can be used to advantage in different kinds of slip or freewheel clutches and variable speed gears. The most common kind of clutch or coupling element for this purpose has the form of a grip-roller which is carried by a rotatable member in a recess defined by an inclined roller-guide surface and which can be firmly clamped under a wedging action against a cylindrical surface of a further rotatable member. Another kind of clutch is one which operates through a non-round grip-body arranged for movement, for example, in a groove in which the body is gripped firmly when rotated in one direction and released when rotated in the opposite direction.

These known coupling members and elements function satisfactorily in the case of slip clutches. In the case of variable speed transmission or gears, however, in which the clutch is engaged and disengaged a large number of times per unit of time and in which each coupling element transmits relatively large forces, these slip-clutch members are encumbered with certain drawbacks. The most serious of these drawbacks is that the coupling element, or the surfaces against which it is clamped, become worn relatively quickly. This wear causes the gears to function unsatisfactorily. Wear on the coupling element is mainly caused by the occurrence of elastic deformation in the guide surfaces and the clamping or gripping surfaces, from the point at which the gripping surfaces of the coupling element lie in sliding contact with the guide surfaces to the point at which the gripping surfaces are firmly clamped against the guide surfaces. Under the influence of this deformation, the freewheel roller will wander some distance along the cylindrical surface and the opposing, inclined wedge surface. A corresponding, although less comprehensive, wandering movement is obtained when clamping the aforesaid rotatable grip-body between the guide surfaces, the gripping surfaces of said body being pressed in towards the guide surfaces, causing rubbing of the gripping surfaces thereagainst. This wandering or rubbing of the grip-body takes place under increasing pressure, until the friction required to effect clamping has been reached. The relative movement between the grip-body and the guide surfaces during the clamping moment gives rise to undesirable wear. In addition hereto, this relative movement also affects the possibility of accurately establishing the moment at which power transmission takes place, which is a further drawback. This wandering movement also prolongs the time taken to reach a fully clamped position, which is a considerable disadvantage in variable speed gears or automatic transmissions.

A prime object of the invention is to provide a clutch arrangement which is not encumbered with these disadvantages.

In accordance with the invention this object is achieved with a clutch arrangement in which the two gripping surfaces of the coupling element are located on two mutually separated or mutually movable and separated main components of said coupling element, the common centre of rotation of which components lies in the close proximity of or in a plane passing through one guide surface of the guide, and in which the coupling element and its gripping surfaces are so formed and arranged that from the moment of being in sliding abutment with the guide surfaces to the moment of being fully clamped, the gripping surfaces have a direction of movement at right angles to the guide surfaces.

Thus, because the gripping surfaces of the coupling element execute a movement substantially at right angles to the guide surfaces during the period of said elastic deformation, there will be no wear as a result of rubbing. In addition, clamping of the coupling element is effected much more rapidly than has been possible hitherto.

Preferred embodiments of the invention together with characteristic features thereof are set forth in the depending claims 2–7.

Suitable embodiments of the clutch arrangement according to the invention are shown by way of example in the accompanying drawings, in which FIG. 1 illustrates schematically in perspective a first embodiment of a clutch arrangement according to the invention, in which the coupling element is shown in connection with the groove in which it is moved and clamped;

In the embodiments illustrated in FIGS. 1–6 one of the members capable of rectilinear or rotary movement relative to one another has the form of a rail or bar 10 and 11 provided with a guide means for guiding the coupling element, a part of which forms a lever means. Clamping is effected when the lever-forming part of the coupling element is acted upon in the direction of arrow 12. In the Figures, the arrow 12 also represents, symbolically, the other of the aforesaid two members capable of rectilinear or rotational movement relative to one another.

In the embodiments illustrated in FIGS. 1–4, the gripping or clamping surfaces of the coupling element are located on two main components which can be rotated relative to one another and the common centre of rotation of which lies in the proximity of or in a plane extending through one guide surface of the aforesaid guide. In the embodiment illustrated in FIGS. 5 and 6, the coupling element has the form of a single-piece structure.

Figure 1:
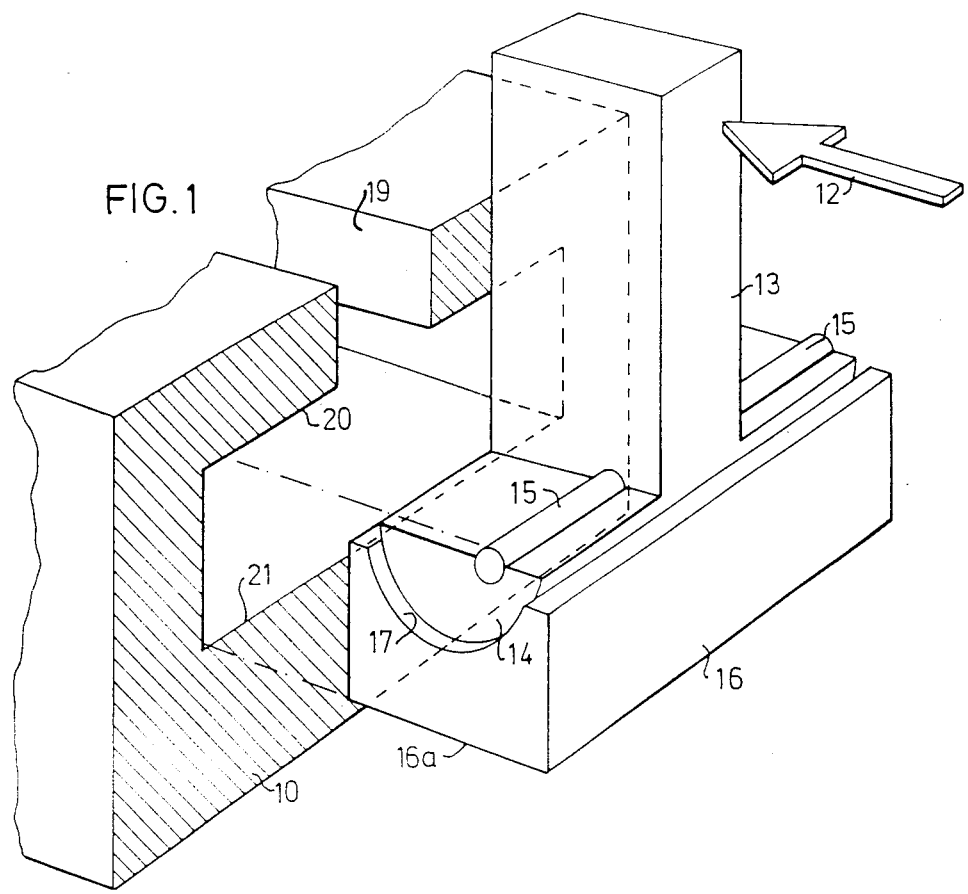
Figure 2:
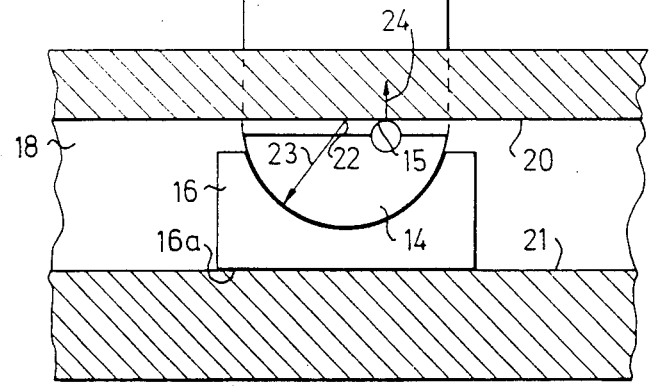
FIG. 2 is a side view of the arrangement illustrated in FIG. 1, with the upper and lower walls of the groove shown in section.

In the embodiment of FIGS. 1 and 2 one main component 14 of the coupling element has the form of an inverted-T, the vertical leg 13 of which forms the lever-forming part of the coupling element, and the two transverse arms of which have a semi-cylindrical configuration. Arranged on the upper surfaces of the transverse arms of the main component 14 are rods which together form one gripping surface 15 of the coupling element. The other main component of the coupling element comprises a slide means 16 having on the upper surface thereof a cylindrical recess 17 in which the semi-cylindrical transverse arms of the main component 14 are journalled, and a planar undersurface which forms the other clamping or gripping surface 16a of the coupling element. As will be seen from FIGS. 1 and 2, the coupling element can be moved in a groove 18 in the rail 10, and firmly clamped in said groove. The rail 10 also has provided therein a slot 19 for accommodating the leg 13 of the component 14. The mutually opposing walls 20,21 of the groove form guide surfaces for the mutually distal gripping surfaces 15, 16a of the coupling element.

As will be seen from FIG. 2, the centre of rotation 22 of the semi-cylindrical transverse part of the component 14 lies in the same plane as the guide surface 20. The radius of the cylinder surfaces is referenced 23. When the leg 13 of the component 14 is acted upon by a force in the direction of the arrow 12, a clamping or gripping force 24 is generated against the guide surface 20 at the gripping surface 15. Naturally, a corresponding force will be generated at the gripping surface 16a. Since the transverse part of the component 14 rotates about a centre which lies in plane with the guide surface 20, the gripping surface 15 will move about the same centre and around a circle which cuts the guide surface 20 at its point of contact. At this point of contact, movement of the gripping surface 15 is commanded or controlled by the elastic deformation obtained in the guide surface 20 and in the gripping surface 15. Since this movement is extraordinarily slight it can be considered as a rectilinear, tangential movement, i.e. movement in a direction at right angles to the guide surface 20. As a result of this design of the clutch or coupling element, there will be no rubbing of the gripping surfaces against the guide surfaces during periods of increased load, right up to the moment when clamping is achieved. Minor deviations from the exact position of the centre 22 in the plane of the guide surface 20 are unavoidable, due to the varying accuracies in manufacture, and hence small deviations from the precise perpendicular location at which the gripping surface presses against the guide surface are considered to lie within the scope of the invention.

Figures 3, 4:
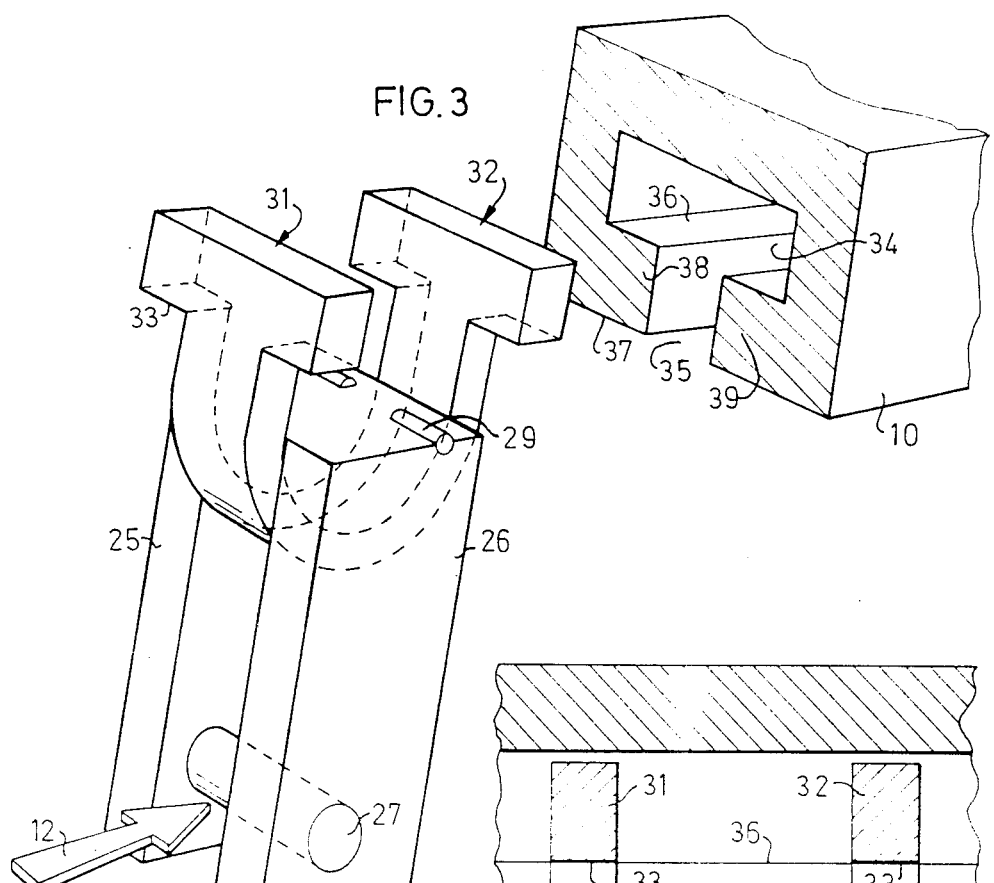
FIG. 3 is a schematic, perspective view of a second embodiment of the invention, illustrated in a similar manner to that in FIG. 1, wherewith this embodiment has gripping surfaces which clamp against mutually opposite sides of a flange.
FIG. 4 is a longitudinal sectional view through the guide and the coupling element illustrated in FIG. 3.

In the second embodiment, illustrated in FIGS. 3 and 4, the one main component of the coupling element has the form of a double-plate component having a vertical portion comprising two mutually parallel, plate-like legs 25,26 which are connected together at their outer ends by means of a shaft 27, by means of which force exerted thereon is transmitted to the coupling element, as indicated by the arrow 12. The inner ends of the legs are connected through a cylinder segment 28, the planar upper side of which lies in the plane of the leg-end surfaces therelocated. Let into these end surfaces of the legs are two rods which form the one gripping surface 29 of the coupling element.

Extending around the cylinder segment 28 is a U-shaped stirrup which forms the other main component of the coupling element. The ends of the two leg parts 30 of the stirrup are provided with T-shaped feet 31,32, the undersurfaces of the laterally extending portions of which form the other gripping surface 33 of the coupling element.

In the embodiment illustrated in FIG. 3 the rail or bar 10 has arranged therein an elongated rectangular groove 34 for accommodating the lateral parts of the feet 31,32, and a slot 35 for accommodating the legs 30. In the embodiment of FIGS. 3 and 4, the undersurface 37 of the rail 10 forms a guide surface for guiding the gripping surface 29 of the coupling element facing the gripping surface 33. Clamping will thus take place against opposite sides 36, 37 of the two flange-like edge portions 38,39 forming the defining surfaces of the slit 35.

Rotation of one main component 28 of the coupling element of this embodiment also takes place about a centre, here referenced 40, lying on the one guide surface, namely the downwardly facing, external guide surface 37. The cylinder segment 28 and the inner surface of the central part of the stirrup have the same cylinder radius 41 with the centre at point 40. Thus the gripping surface 29 of this embodiment will also press against the guide surface 37 at substantially right-angles thereto under the elastic deformation occurring during clamping of the gripping surfaces.

Figure 5:
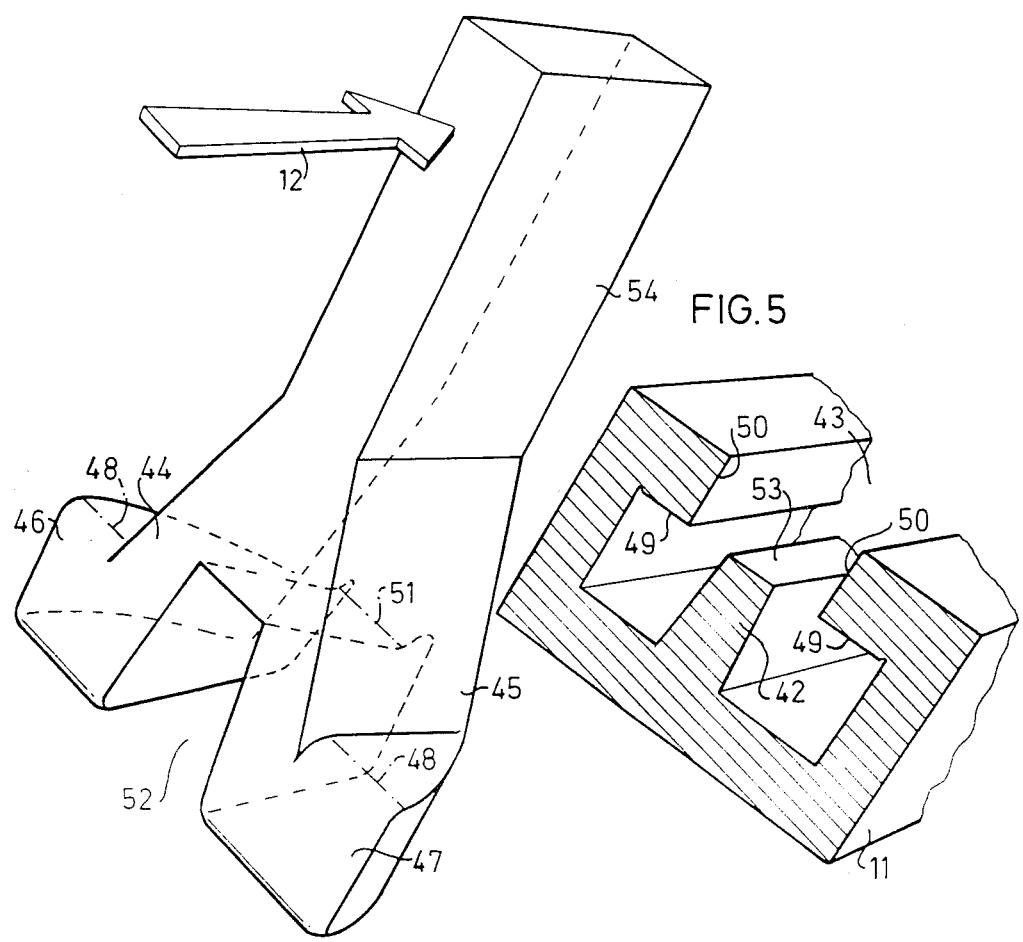
FIG. 5 is a schematic, perspective view of a third embodiment.
Figure 6:
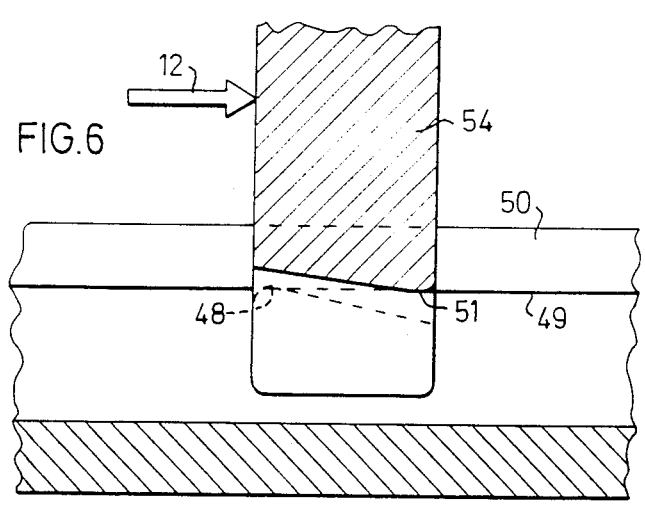
FIG. 6 is a longitudinal sectional view of the third embodiment and the guide thereof.

In the embodiment illustrated in FIGS. 5 and 6, the groove located in the rail or bar 11 has arranged centrally thereof a wall 42 which is located within the confines of a relatively wide slot 43, the width of which is greater than that of the central wall 42 so that the bifurcate coupling element, here in the form of a single-piece structure, can straddle the wall and ride thereon. Thus, the legs 44,45 of the bifurcate coupling element extend into the groove in said rail, on either side of the central wall 42. The ends of the legs 44,45 are provided with feet 46,47 whose upper surfaces form gripping surfaces 48, which lie against the undersurfaces 49 of the flanges 50 on the rail 11. In addition, the coupling element has a third gripping surface 51, which is located at the end edge of the recess 52 located between the legs 44,45, said end edge lying furthest away from the two gripping surfaces 48. In FIG. 5, the three gripping or clamping surfaces 48,51,48, are shown in chain lines. The third gripping surface 51 lies against the upper surface 53 of the central wall 42.

The three guide surfaces 49,52,49 of the rail 11 are spaced laterally, one from the other, and lie parallel with one another with said surfaces in substantially the same mutual plane, the two outer guide surfaces 49 facing in a direction opposite to that of the intermediate guide surface 53.

When a force is applied to the lever-forming leg 54 of the coupling element in the direction of the arrow 12, the rocking movement caused by the elastic deformation created by clamping the coupling element will be minimal. In this respect, the coupling element is rocked around the gripping surface 51, with said surface as the centre of rotation, while the gripping surface 48 is pressed against the guide surface 49 at right angles thereto. Thus, the aforementioned disadvantages encountered with the coupling elements of known clutch arrangements are also avoided with this embodiment.

What I claim is:

1. A clutch arrangement for coupling together two mechanisms, said arrangement comprising first and second members, said first member comprising: a lever arm; a partially cylindrical section fixed perpendicularly to said lever arm, said partially cylindrical section comprising a substantially planar surface having at least one gripping element fixed to said planar surface and extending parallel to but spaced from the axis of said partially cylindrical section; and a guide element in which said partially cylindrical section may rotate; and said second member comprising: a recess adapted to receive said guide element and a substantially planar gripping surface adapted to cooperate with said gripping element; said first and second members being so dimensioned that, when said first and second elements are coupled, said planar surface of said partially cylindrical section and said planar gripping surface are spaced from and substantially parallel to one another, and said gripping element bears against said gripping surface.

2. Clutch arrangement according to claim 1, wherein said recess comprises: an opening through which said lever arm may pass; and an interior cavity in communication with said opening, said interior cavity comprising upper surfaces adjacent said opening, said upper surfaces serving as said substantially planar gripping surface, said cavity being adapted to receive said partially cylindrical section and said guide element.

3. Clutch arrangement according to claim 1, wherein said lever arm comprises spaced parallel bars interconnected by said partially cylindrical section, said substantially planar surface of said partially cylindrical section facing outwardly of said parallel bars, said guide element being a substantially U-shaped member passing between said parallel bars, said guide element comprising ends adapted to be received in said recess, said substantially planar gripping surfaces of said second element being located exteriorly of said recess.

4. Clutch arrangement according to claim 3, wherein said recess has substantially a T-shape, and said ends of said guide element have a corresponding T-shape.

* * * * *